Figure 1:
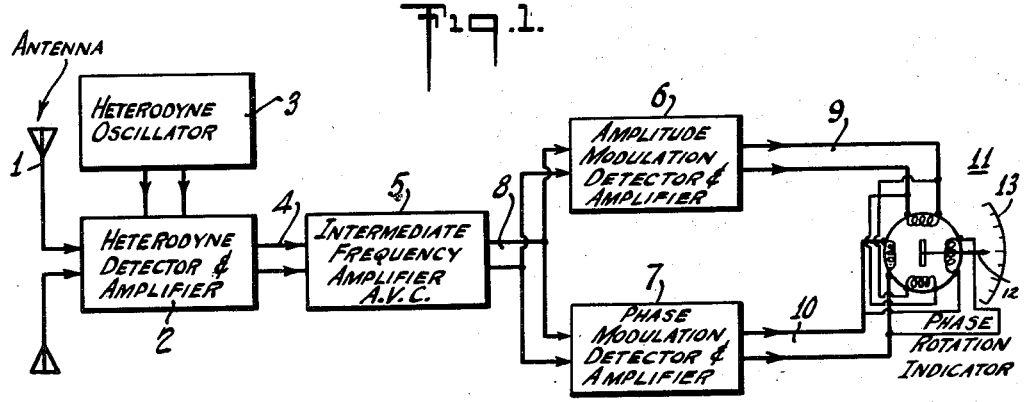

Oct. 3, 1950 C. W. HANSELL 2,524,702
FREQUENCY COMPARISON SYSTEM
Filed July 1, 1942 2 Sheets—Sheet 1

INVENTOR
CLARENCE W. HANSELL.
BY H. S. Snover
ATTORNEY

Oct. 3, 1950 — C. W. HANSELL — 2,524,702
FREQUENCY COMPARISON SYSTEM
Filed July 1, 1942 — 2 Sheets-Sheet 2

INVENTOR
CLARENCE W. HANSELL.
BY H. S. Grover
ATTORNEY

Patented Oct. 3, 1950

2,524,702

UNITED STATES PATENT OFFICE 2,524,702

FREQUENCY COMPARISON SYSTEM

Clarence W. Hansell, Rocky Point, N. Y., assignor to Radio Corporation of America, a corporation of Delaware Application July 1, 1942, Serial No. 449,255

9 Claims. (Cl. 343—8)

The present invention relates to an efficient method of and means for comparing two currents of different amplitudes and different frequencies.

My United States Patents Nos. 2,095,980 and 2,207,540 describe arrangements for comparing the current from a source of constant frequency with a current from a source of variable frequency and for utilizing the beat frequency to control or stabilize the source of variable frequency. The present invention provides an alternative system which can be used also for many different purposes.

One of the objects of the present invention is to provide means for determining which of the two frequencies is higher than the other.

Another object of the invention is to provide an aircraft with means for determining by radio waves whether it is approaching or receding from an object.

Broadly stated, the present invention is based upon the observation that when two currents of different amplitudes and different frequencies are combined in a single circuit, there is a 90° phase difference between the modulations of amplitude and of phase of the stronger current by the weaker current, and there is a relative phase reversal as the frequency of the weaker current passes through the frequency of the stronger current. Putting it in other words, whenever two currents beat together the resultant current is always both amplitude and phase modulated. The modulations of amplitude and phase are different by 90°, i. e., they occur at different times, different by the time of one-quarter cycle of the beat. If the weaker current has a lower frequency than the stronger current, then the phase rotation of the two modulations is in one direction (depending upon definitions) and if the weaker current has a higher frequency than the stronger current, then the phase rotation of the two modulations is in an opposite or reverse direction.

According to the invention, a radio receiver is designed to beat two received carrier currents together in order to furnish two output currents, one due to the amplitude modulations and the other due to the phase modulations of the carrier currents. The relative timing or phase rotation of the two output currents is an indication of whether or not the weaker of the two currents has a frequency above or below the frequency of the stronger current.

In one embodiment of the invention, the two-phase output of the receiver is applied to a suitable indicating device in order to determine which current has the higher frequency. By utilizing the Doppler effect and employing direct and reflected waves, it is thus possible to determine whether an aircraft, equipped with the apparatus of the invention, is approaching or receding from an object, such as another aircraft.

In another embodiment of the invention, the indicating instrument is provided with contacts for automatically correcting the frequency of a transmitter if it departs from a reference frequency by more than any arbitrary amount.

Other objects, features and their advantages will appear from a reading of the following description which is accompanied by a drawing, wherein Figs. 1, 2, 3, 4, 5 and 6 show six different embodiments of the invention.

Throughout the figures of the drawing the same parts are represented by the same reference numerals.

Referring to Fig. 1 in more detail, there is shown in its most simplified form, a receiver of the invention equipped to determine which of two received frequencies is higher than the other. Let us assume that the two frequencies to be compared by the receiver are a frequency of a remote transmitter and a reference frequency, both of which are radiated from more or less remote points. With this assumption, normally the transmitter current will be the stronger of the two input currents to the receiver. These two input currents may be in the transmitter output frequency range, or may be at a multiple or sub-multiple of this range, as dictated by convenience, in each case. The receiver of the invention compries an antenna 1 which feeds into a heterodyne detector and amplifier 2, the latter beating the received currents against the currents from a local heterodyne oscillator 3, in order to produce in the output circuit 4 intermediate frequency energy which is amplified by intermediate frequency amplifier apparatus 5.

So far, we have described a conventional superheterodyne receiver, except for the detecting circuits to be described later. It is preferred that this receiver have an automatic volume control arrangement in order to assure a substantially constant intermediate frequency current level at the output of the intermediate frequency amplifier 5. This automatic volume control may be any one of numerous conventional circuits and its presence is indicated by the letters AVC in the apparatus 5. Unlike the conventional superheterodyne receiver, however, the receiver of Fig. 1 is provided with both an amplitude modulation detector 6 and a phase modulation detector 7, both apparatus 6 and 7 including suitable amplifiers following the respective detectors. The amplitude modulation detector 6 and the phase modulation detector 7 both share the intermediate frequency power output in circuit 8, and both operate simultaneously to give outputs in leads 9 and 10 at the beat frequency corresponding to the difference in frequencies between the two input currents. The amplitude modulation detector 6 and the phase modulation detector 7 may comprise any suitable well known apparatus for performing their intended functions. As an illustration: the phase modulation detector 7 may take any of the suitable forms illustrated and described in Crosby U. S. Patents Nos. 2,060,611, November 10, 1936; 2,065,565, December 29, 1936; and 2,101,703, December 7, 1937. The demodulated output due to changes in amplitude, will appear in leads 9 in the output of apparatus 6, while the demodulated output due to changes in phase, will appear in the leads 10 in the output of apparatus 7.

The output currents from the two detectors in leads 9 and 10 will be substantially 90° different in phase from each other, regardless of the output beat frequency, so that the two output currents provide a two-phase current. The relative timing, or polarity, or direction of phase rotation of the two currents in 9 and 10 reverses as the frequency of the weaker current is moved through the frequency of the stronger current, or vice versa. The two-phase output currents in leads 9 and 10 (preferably amplified) are applied to the two windings of a phase rotation indicator 11 having an armature similar in principle to that of a two-phase induction motor. The direction of torque produced upon the armature or moving element of the indicator to which the needle 12 is linked is determined by the relative timing or polarity or direction of phase rotation of the two currents. Consequently, the indicating element here represented by needle 12 will be deflected in one direction or the other, depending upon whether or not the frequency of the weaker current is above or below the frequency of the stronger current. Observation of this indication may be had by observing the needle 12 as it moves over the scale 13. If desired, the indicator 11 may be so designed that the torque increases with increase of frequency over a large range. Therefore, the amount of rotation of the indicator from its center position against the restoring force of a spring may be a measure of the difference of frequency between the two input currents, while the direction of the rotation will show whether the transmitter frequency is above or below a desired reference frequency.

Fig. 1 thus provides an indicating instrument which enables the operating personnel to observe frequency deviations of a transmitter and to correct for such deviations.

At this time it should be understood that the two input currents which are received upon the antenna 1 may either be of continuous wave character or be constituted by trains of pulses, in the latter case of which it will be necessary to have the pulse rate or pulse frequency higher than the highest required beat frequency.

Figure 2:
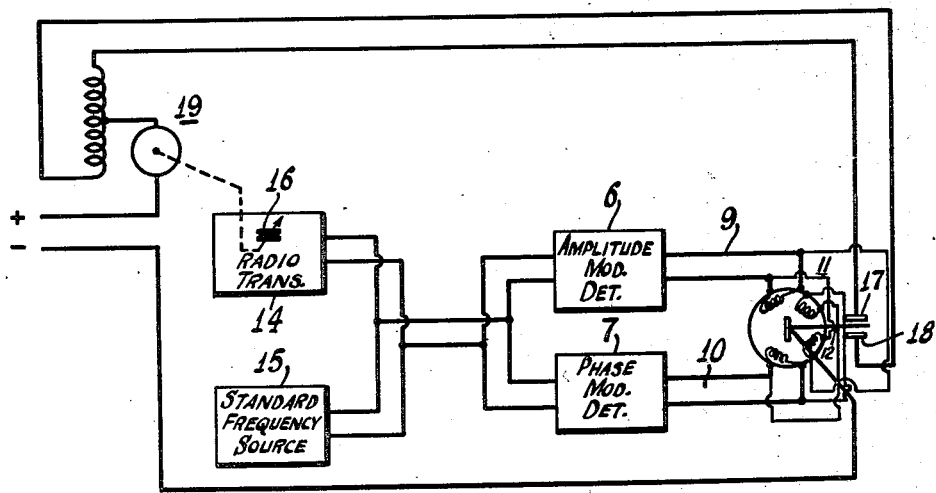

Fig. 2 is a modification of Fig. 1, and shows how the invention can be employed to automatically control the frequency of a radio transmitter when it varies from a standard or reference frequency. The radio transmitter is shown diagrammatically at 14 and the standard frequency source (which may be a crystal controlled type) is shown at 15. The output currents from the radio transmitter 14 and the standard frequency 15 are impressed both upon the amplitude modulation detector and amplifier 6 and upon the phase modulation detector and amplifier 7. The outputs from the detectors 6 and 7 appearing respectively in leads 9 and 10 are applied to the two windings of a phase rotation indicator or motor 11' which has its needle 12 designed to engage a pair of contacts 17 and 18, depending upon the direction of movement of the needle 12, upon movement of the armature of the phase rotation motor 11'. Contacts 17 and 18 are connected to opposite terminals of the field coil of a small motor 19, whose armature is linked to a variable reactance, here shown as a condenser 16. This condenser may be one of the frequency determining elements of the radio transmitter 14, and is varied in such direction as to restore the frequency of the radio transmitter to the assigned frequency upon departure from the frequency of the standard. I thus provide an automatic frequency control system. Although the radio transmitter 14 and the standard 15 are shown directly connected to the detectors 6 and 7 by means of leads, these elements may be coupled to the detectors in any suitable way, as by means of antenna coupling, in which case I could use the antenna and the heterodyne detector and amplifier scheme of Fig. 1. Also a heterodyne frequency changer and amplifiers may be interposed between the sources of current 14 and 15 and the detectors 6 and 7.

Figure 3:
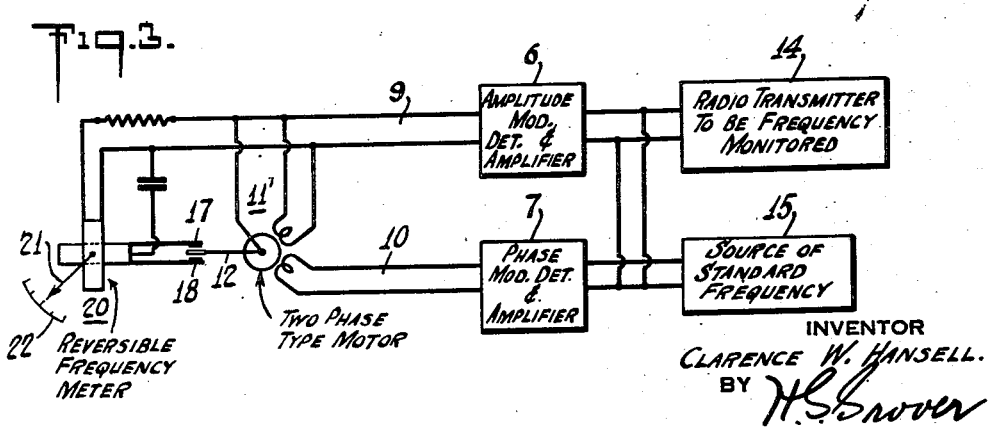

Fig. 3 shows the invention applied to a frequency meter scheme. The system of this figure is designed to indicate whether the frequency of the radio transmitter 14 is higher or lower than or identical with the frequency of a standard source 15, and, if there is any difference between the frequencies of these two sources, the extent of the deviation. As in Fig. 2, the outputs of the transmitter 14 and the source of standard frequency 15 are both applied to the amplitude modulation detector 6 and the phase modulation detector 7. The frequencies applied to the detectors 6 and 7 are preferably of an intermediate frequency character, for which reason it is preferable that there be a heterodyne oscillator and heterodyne detector and amplifier as well as an intermediate frequency amplifier between sources 14 and 15 of the detectors 6 and 7. The apparatus for producing intermediate frequencies are well known and are not shown in this figure, although similar apparatus is shown in Fig. 1. The outputs from the two detectors 6 and 7, which appear in leads 9 and 10, respectively, are substantially 90° different in phase regardless of the output frequency, so that the two output currents in leads 9 and 10 provide a two-phase current, in the same manner described above in connection with Figs. 1 and 2. This two-phase current is applied to the two-phase motor type of relay 11', substantially of the same type shown in Fig. 2. Relay 11' is provided with contacts 17 and 18 which are alternately adapted to make contact with the needle 12 depending upon the direction of motion of the motor relay, the needle, in turn, being connected to the armature of the motor 11'. A reversible frequency meter 20 having a needle 21 movable over a scale 22 serves to indicate whether or not the frequency of the radio transmitter is above or below the frequency of the standard 15 and the extent of deviation. A suitable zero point on the scale 22 will represent the standard frequency. The frequency meter 20 is of a well known type but ordinarily this type of meter deflects in only one direction, to indicate a frequency above zero. In order to make the instrument reversible, so to speak, in order to deflect in two directions, I have provided two portions in one coil of the meter 20 which are used alternately to obtain deflection in either of two directions depending upon whether needle or arm 12 is touching contact 17, or contact 18. The meter 20 thus deflects in one direction or the other, depending upon the phase rotation of the two-phase output of the detectors 6 and 7, and therefore depending upon the frequency relation between the weaker and stronger input currents to the apparatus constituting the amplitude and phase modulation detectors. The amount of the deflection, just as in the conventional types of frequency meter, is then a measure of the beat frequency.

In the arrangement of Fig. 3 it is assumed that currents from the transmitter 14 and the source 15 delivered to detectors 6 and 7, have constant amplitudes, which will usually be easy to accomplish in practice. As an aid to holding the currents constant, if the transmitter power is subject to variations or changes in value, an amplitude limiter, or an automatic volume controlled amplifier may be inserted between transmitter 14 and the detectors 6 and 7.

Figure 4:
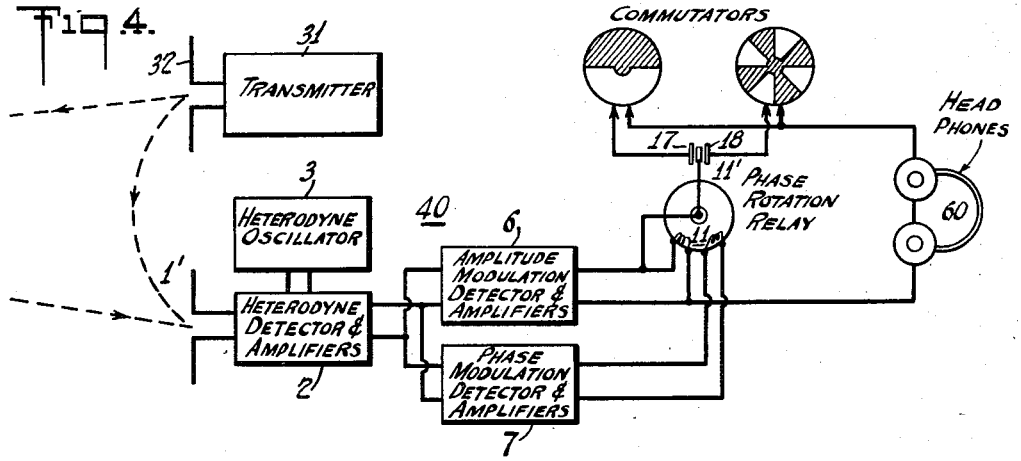
Figure 5:
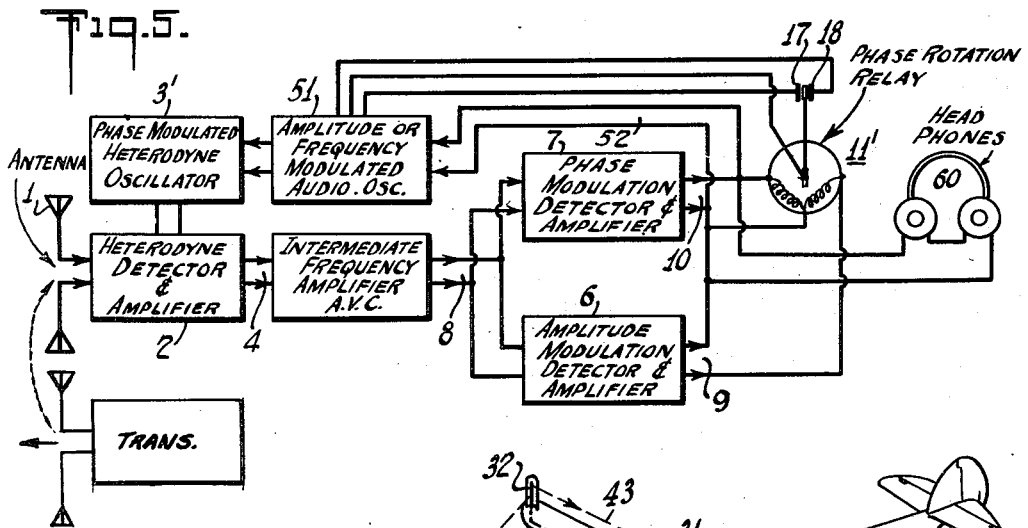
Figure 6:
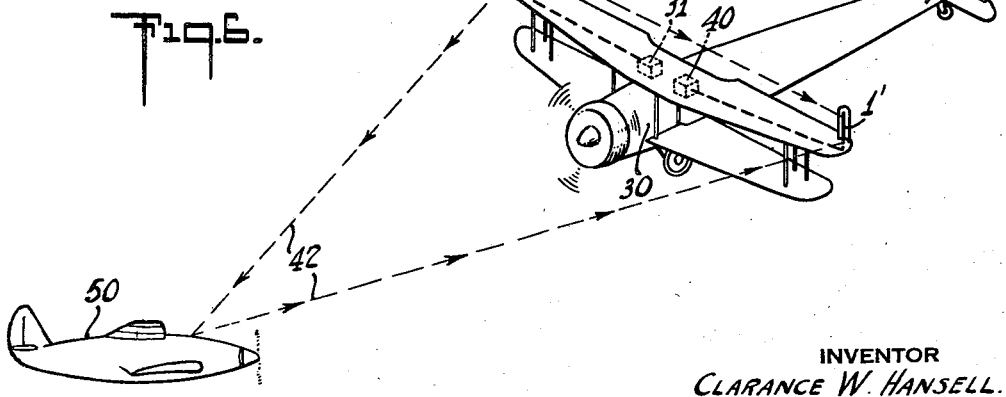

Fig. 6 illustrates diagrammatically the application of the invention to an airplane, for determining whether the airplane is traveling toward or away from an object. Such a scheme may serve to prevent collisions between planes or between an airplane and any other object in its path of travel. The airplane 30 is equipped both with a transmitter 31 for radiating over a directive antenna 32 suitable waves in the direction of travel of the plane. The airplane is also provided with a receiver 40 which is coupled to the receiving antenna 1' for receiving the waves which are reflected from the object in the path of travel. Apparatus for the receiver 40 is shown in Figs. 4 and 5, but before entering into a detailed description of this apparatus a general exposition of the operation of the scheme shown in Fig. 6 will be given.

The waves radiated from the transmitting antenna 32 and impinging upon an object 50 in the path of travel of the plane, will be reflected from the object and will be collected by receiving antenna 1' in the manner shown by the dash lines 42 of Fig. 6. The arrows on these dash lines serve to indicate the direction of travel of the waves between the transmitting antenna 32 and the receiving antenna 1'. These antennas have been shown, by way of example only, as dipoles backed up by suitable reflectors to assure a unidirectional pattern. It should be understood that the representation of these antennas is merely diagrammatic and that they may take other forms and be embodied in the wings of the plane. Furthermore, it may be possible to employ a single antenna structure for both transmission and reception. In many cases the antennas may be substantially non-directive when it is desired to observe the presence and motions of objects in a wide variety of directions. The antennas also provide a direct radiation, represented by dash line 43 between the transmitting antenna 32 and the receiving antenna 1'. Usually, the direct radiation may be obtained in sufficient amount, as compared with the reflected radiation, without any special provision being made for it.

This direct radiation can, if desired, be controlled by a direct coupling provided within the plane itself, between the transmitter and receiver, which is made to oppose, or add to the unavoidable coupling normally existing between nearby antennas, even those which are highly directive. This latter arrangement is preferred.

The receiver 40 is preferably of the superheterodyne type and is equipped both with an amplitude and a phase modulation detector to share the intermediate frequency output, in order to provide outputs at the frequency corresponding to the difference in frequency between the two input currents representative of the direct and reflected waves. It will be apparent that the direct wave will be the stronger of the two waves, while the reflected wave will have a frequency depending upon the motions of the planes 30 and 50. According to the Doppler principle, if the plane 30 is approaching the object 50, the frequency of the reflected waves will be higher than that of the direct waves; and if the plane 30 is receding from the object 50, the reflected wave will have a frequency lower than the frequency of the direct wave. Hence, the two wave components, direct and reflected (due to the Doppler effect), have a difference in frequency depending upon the motions of the planes.

Fig. 4 illustrates one form of apparatus which may be used in the system of Fig. 6. In the apparatus of Fig. 4 a radio transmitter 31 supplies power continuously to antenna 32 from which the power may be radiated predominantly in a forward direction. A portion of the radiated power will be reflected back to the directional receiving antenna 1' from reflecting objects, such as another airplane, while another larger portion will reach the receiving antenna by local coupling. The direct and reflected waves reaching the receiving antenna 1' are heterodyned down to an intermediate frequency and amplified by suitable apparatus 2, and applied to amplitude and phase modulation detectors 6 and 7, respectively, which provide a two-phase frequency output as a result of the beating together of direct and reflected waves from antenna 32 to antenna 1'.

Assume, as an example, that the frequency of the waves transmitted from the antenna 32 is 3,000 megacycles, corresponding to a wave length of 0.1 meter. If the combined relative velocities of the two airplanes, toward or away from one another, is as much as 300 meters per second, corresponding to a relative combined velocity of about 670 miles per hour, or 335 miles per hour per plane, the maximum beat frequency between direct and reflected waves would be about 3,000 cycles per second.

If amplified beat frequency energy from one of the detectors is applied to a pair of earphones, worn by the pilot, he will be able to hear the beat frequency which results from the presence of an object, such as another plane, which lies on or near his line of flight. By turning his plane, to change the relative velocity, the pilot can change the beat frequency. If he manoeuvers to increase the frequency and the intensity of the beat frequency energy, he will be bringing the two airplanes closer together whereas if he manoeuvers to increase the frequency but decrease the intensity, he will be bringing them further apart. By using directive transmitting and receiving antennas the change in beat note intensity can be made quite sensitive to the heading of the plane so that, with a little practice, a pilot may readily approach, or keep away from, another airplane, by means of the system, without any other means of detecting the presence of the other plane. Therefore the system as so far described enables a pilot, flying in dark or fog, to find, or to avoid, another plane. He may, of course, be provided with a manually operated volume control to control the overall sensitivity of the system so that planes or other objects may be detected at maximum distance but, at lesser distances, overloading of the receiver, or of the earphones may be avoided. Setting of the volume control, and loudness of the beat note in the phones, then provide the pilot with a rough measure of distance.

As a refinement, valuable under some circumstances, such as when the transmitter and receiver are at ground stations, or on mobile objects which are hard to manoeuver, I may provide the operator with an additional means of determining whether or not the reflecting object is moving toward or away from the antennas of the system. One such additional means is illustrated in Fig. 4.

In the arrangement of Fig. 4 output from the amplitude and phase modulation detectors provides a two-phase audio output in which the direction of phase rotation reverses as the frequency of the reflected waves moves through the frequency of the radiated waves. Therefore the direction of phase rotation provides a means of indicating whether or not the reflecting object has a velocity toward, or away from, the antennas 32 and 1'. To make this indication available for the observer, I have provided a means to modulate the beat frequency current supplied to the earphones, and the frequency of the modulation is an indication of whether or not the beat note is due to the reflecting object moving toward, or away from, the observer.

In the arrangement of Fig. 4, by way of illustration only, I have shown two commutators which make and break circuits through them at constant but different rates. The input to the earphones passes through one commutator or the other depending upon which of contacts 17 and 18 is contacted by the moving element of the phase rotation relay 11'. The motion of the phase rotation relay, in turn, is of course determined by the direction of phase rotation of the amplified, two-phase, beat frequency currents supplied to it from the amplitude and phase modulation detectors 6 and 7.

The arrangement of Fig. 4 is a good one to use when the product of wave frequency and maximum relative velocities is high so that the beat note frequency delivered to the earphones ranges up to fairly high values. When the product of wave frequencies and relative velocities is low, thereby resulting in low frequency beats between direct and reflected waves, the arrangement of Fig. 5 is more suitable.

Referring to Fig. 5, assume as an example that the reflecting object is an airplane which has a certain natural or resonant frequency for the wings. The wings, depending upon their dimensions will be resonant as a half wave oscillator at some particular relatively low frequency. At this frequency the wings will provide approximately a maximum of reflection and a minimum of directivity of the reflected waves. Since each type and size of plane has its own resonant frequency the operator, by switching from one transmitted frequency to another, may concentrate on observation to determine the presence and relative motion of one type and size of plane at a time.

To provide for half wave resonance of the wings of the reflecting plane requires relatively long radio wave-lengths, such as, for example, 60 meters wavelength corresponding to 5,000,000 cycles per second. If the two planes have combined speeds toward or away from one another, up to say 300 meters per second, corresponding to a relative combined speed of the two planes of about 670 miles per hour or 335 miles per hour for each plane, the maximum beat frequency would be, say, 5 cycles per second, which is too low to be directly audible. In order to make the beats audible, I propose utilizing them to modulate an audible frequency in the range, let us say, for example, 400 to 1200 cycles per second. In the operation of the system of Fig. 5, the beat frequency current in the leads 10, in the output phase modulation detector 7, produced from the intermediate frequencies obtained from collecting on antenna 1' the direct and reflected waves, is fed back to modulate an audio oscillator 51 which, in turn, modulates the phase of the local heterodyne oscillator 3'. The five cycle beat note, it will thus be evident, serves two purposes; namely, to modulate the audio oscillator 51 and also to operate the phase rotation relay 11'. This relay 11' by means of its contacts 17 and 18 determines the mean frequency of the audio oscillator 51. The five cycle beat frequency preferably amplitude modulates the output from the audio frequency oscillator 51 to the heterodyne oscillator 3' by substantially 100% and the modulated oscillator output from audio oscillator 51 then phase or amplitude modulates the heterodyne oscillator 3'. In the particular arrangement shown in Fig. 4, where the headphones 60 for the airplane pilot are connected to the output of the phase modulation detector 7, it is assumed that the heterodyne oscillator 3' is phase modulated. If the headphones 60 on the other hand are connected to the output of the amplitude modulation detector 6, then the heterodyne oscillator 3' should be amplitude modulated.

The audio oscillator 51 is one which is not energized until one contact 17 or the other 18 of the phase rotation relay 11' closes and then the audio oscillator 51 has a different frequency, depending upon which contact closes. These contacts on the phase rotation relay serve to change the constants of the frequency determining circuit for the audio oscillator 51, as well as to energize the audio oscillator. If the planes are moving apart, the pilot may hear, say, 400 cycles current modulated at the beat frequency between the direct and reflected currents, whereas if they are coming together, he may hear, say, 1200 cycles current modulated at the beat frequency rate. The headphones are, of course, not responsive to the five cycle beat but are responsive only to the audio modulation of 400 or 1200 cycles. With this indication of direction and magnitude of relative motion of the plane, the pilot may readily manoeuver to increase or decrease the distance between the planes.

If he changes direction, up or down, right or left, he can hear the change in beat frequency which tells him immediately whether he has turned more toward or more away from the other plane. In practice, it may be desirable to use the wings of the plane both for transmitting and receiving purposes, and, if desired, balancing arrangements already known in the art may be used to decrease the input to the receiver, which is obtained directly from the transmitter. As previously mentioned, the transmitted wave may be either of continuous wave form or may comprise spaced pulses, each pulse of which is composed of a train of waves.

What is claimed is:

1. A receiver having an antenna for receiving waves of more than one frequency, a heterodyne detector, a heterodyne oscillator coupled to said detector for beating with the received waves to produce an intermediate frequency, an intermediate frequency amplifier, a phase detector and an amplitude modulation detector, individual couplings from the output of said intermediate frequency amplifier to the inputs of said detectors, and a multi-winding phase rotation responsive device having different windings coupled to the different outputs of said detectors.

2. A frequency comparison system comprising means for beating together the waves to be compared, an amplitude modulation detector and a phase modulation detector, circuits coupling the inputs of both of said detectors to the output of said means, and a two-phase rotation device having one winding coupled to the output of one detector and another winding coupled to the output of the other detector.

3. A receiver having an antenna for receiving waves of more than one frequency, a heterodyne detector coupled to said antenna, a heterodyne oscillator coupled to said detector for beating with the received waves to produce an intermediate frequency, an intermediate frequency amplifier coupled to the output of said heterodyne detector, a phase modulation detector and an amplitude modulation detector, couplings from the output of said intermediate frequency amplifier to the input electrodes of said last two detectors, and a phase rotation responsive device coupled to the outputs of said last two detectors, a contact arm mechanically linked to the armature of said phase rotation responsive device, a pair of contacts oppositely disposed relative to said arm and adapted to alternately engage said arm depending upon the direction of torque produced upon the armature of said device, an audio frequency oscillator coupled to said contacts and arranged to be controlled therefrom, said audio oscillator generating one frequency when said arm engages one of said contacts and another frequency when said arm engages the other of said contacts, a circut for modulating said heterodyne oscillator from said audio oscillator, and an audio frequency translating device coupled to the output of one of said detectors.

4. A receiver having an antenna for receiving waves of more than one frequency, a heterodyne detector coupled to said antenna, a heterodyne oscillator coupled to said detector for beating with the received waves to produce an intermediate frequency, an intermediate frequency amplifier coupled to the output of said heterodyne detector, a phase modulation detector and an amplitude modulation detector, couplings from the output of said intermediate frequency amplifier to the input electrodes of said last two detectors, and a phase rotation responsive device coupled to the outputs of said last two detectors, a contact arm mechanically linked to the armature of said phase rotation responsive device, a pair of contacts oppositely disposed relative to said arm and adapted to alternately engage said arm depending upon the direction of torque produced upon the armature of said device, an audio frequency oscillator coupled to said contacts and arranged to be controlled therefrom, said audio oscillator generating one frequency when said arm engages one of said contacts and another frequency when said arm engages the other of said contacts, a circuit for modulating the phase of the heterodyne oscillator from said audio oscillator, and headphones coupled to the output of said phase detector.

5. A receiver having an antenna for receiving waves of more than one frequency, a heterodyne detector coupled to said antenna, a heterodyne oscillator coupled to said detector for beating with the received waves to produce an intermediate frequency, an intermediate frequency amplifier coupled to the output of said heterodyne detector, a phase modulation detector and an amplitude modulation detector, couplings from the output of said intermediate frequency amplifier to the input electrodes of said detectors, and a phase rotation responsive device coupled to the outputs of said detectors, a contact arm mechanically linked to the armature of said phase rotation responsive device, a pair of contacts oppositely disposed relative to said arm and adapted to alternately engage said arm depending upon the direction of torque produced upon the armature of said device, an audio frequency oscillator coupled to said contacts and arranged to be controlled therefrom, said audio oscillator generating one frequency when said arm engages one of said contacts and another frequency when said arm engages the other of said contacts, a circuit for modulating the amplitude of the heterodyne oscillator from said audio oscillator, and headphones coupled to the output of said amplitude detector.

6. In combination, a pair of sources of waves to be compared, means for beating said waves together, an amplitude modulation detector and a phase modulation detector, circuits coupling the inputs of both of said detectors to the output of said means, and a two-phase rotation device having one winding coupled to the output of one detector and another winding coupled to the output of the other detector, a needle mechanically linked to the rotatable armature of said two-phase rotation device, and a scale having index markings thereon over the length of which said needle moves.

7. The method of comparing the relative frequencies of two alternating currents of different amplitudes and different frequencies, which comprises beating said currents together to obtain two phase displaced output alternating current waves of reduced frequency, one of said two phase displaced waves being due to the amplitude modulations and the other phase displaced wave being due to the phase modulations of said two alternating currents of different frequencies, and producing from said two phase displaced waves sound waves whose frequency is a function of both the difference in frequency between said two currents and the sense or direction of the frequency difference.

8. In a frequency comparison system, a source of reference frequency, a source of varying frequency, apparatus for comparing said frequencies comprising a frequency mixer coupled to both of said sources, and means coupled to the output of said mixer for assuring substantially constant relative magnitude of current derived therefrom, an amplitude modulation detector and a phase modulation detector, circuits individually feeding said two detectors with said constant magnitude current, and a two-winding phase rotation relay responsive to the phase relation of the output currents from said two detectors, one winding of said relay being coupled to the output of said amplitude modulation detector, while the other winding of said relay is coupled to the output of said phase modulation detector.

9. In a frequency comparison system, a source of reference frequency, a source of varying frequency, apparatus for comparing said frequencies comprising a frequency mixer coupled to both of said sources, an amplifier coupled to said mixer, and means for assuring substantially constant relative magnitude of current in the output of said amplifier, an amplitude modulation detector coupled to the output of said amplifier, and a phase modulation detector also coupled to the output of said amplifier, and a two-phase motor having a pair of windings coupled to the outputs of said two detectors.

CLARENCE W. HANSELL.

REFERENCES CITED

The following references are of record in the file of this patent:

UNITED STATES PATENTS

| Number | Name | Date |
| --- | --- | --- |
| 1,934,400 | Bollman | Nov. 7, 1933 |
| 2,104,801 | Hansell | Jan. 11, 1938 |
| 2,177,061 | Gerhard | Oct. 24, 1939 |
| 2,207,540 | Hansell | July 9, 1940 |
| 2,305,614 | Goldstein | Dec. 22, 1942 |
| 2,351,548 | Schwartz | June 13, 1944 |
| 2,377,326 | Crosby | June 5, 1945 |